United States Patent [19]

Murphy

[11] Patent Number: 5,519,377
[45] Date of Patent: May 21, 1996

[54] VEHICLE OBSTACLE MONITORING SYSTEM

[76] Inventor: Sim L. Murphy, P.O. Box 2248, Hempstead, N.Y. 11550

[21] Appl. No.: 115,581

[22] Filed: Sep. 3, 1993

[51] Int. Cl.$^6$ .................................................. B60Q 1/00
[52] U.S. Cl. .................................................. 340/435; 340/904
[58] Field of Search .................................... 340/435, 901, 340/903, 904; 342/70; 180/167, 169

[56] References Cited

U.S. PATENT DOCUMENTS

| | | | |
|---|---|---|---|
| 3,772,692 | 11/1973 | Braddon | 342/41 |
| 4,447,800 | 5/1984 | Kasuya et al. | 340/901 |
| 4,590,378 | 5/1986 | Platz | 250/363.08 |
| 4,849,731 | 7/1989 | Melocik | 340/435 |
| 4,926,171 | 5/1990 | Kelley | 340/961 |
| 5,059,946 | 10/1991 | Hollowbush | 340/435 |
| 5,119,105 | 6/1992 | Ngai et al. | 343/703 |
| 5,319,373 | 6/1994 | Maxwell et al. | 342/55 |

*Primary Examiner*—Donald J. Yusko
*Assistant Examiner*—Michael Day

[57] ABSTRACT

A vehicle obstacle monitoring system for alerting a driver to the presence of an obstacle within a predetermined distance from the vehicle. The system includes a signal generator which radiates a signal around the vehicle and a plurality of signal receivers encircling the exterior of the vehicle. A display monitor located in the interior of the vehicle displays a zone image around the car and alerts the driver to the presence of an obstacle within the zone.

5 Claims, 4 Drawing Sheets

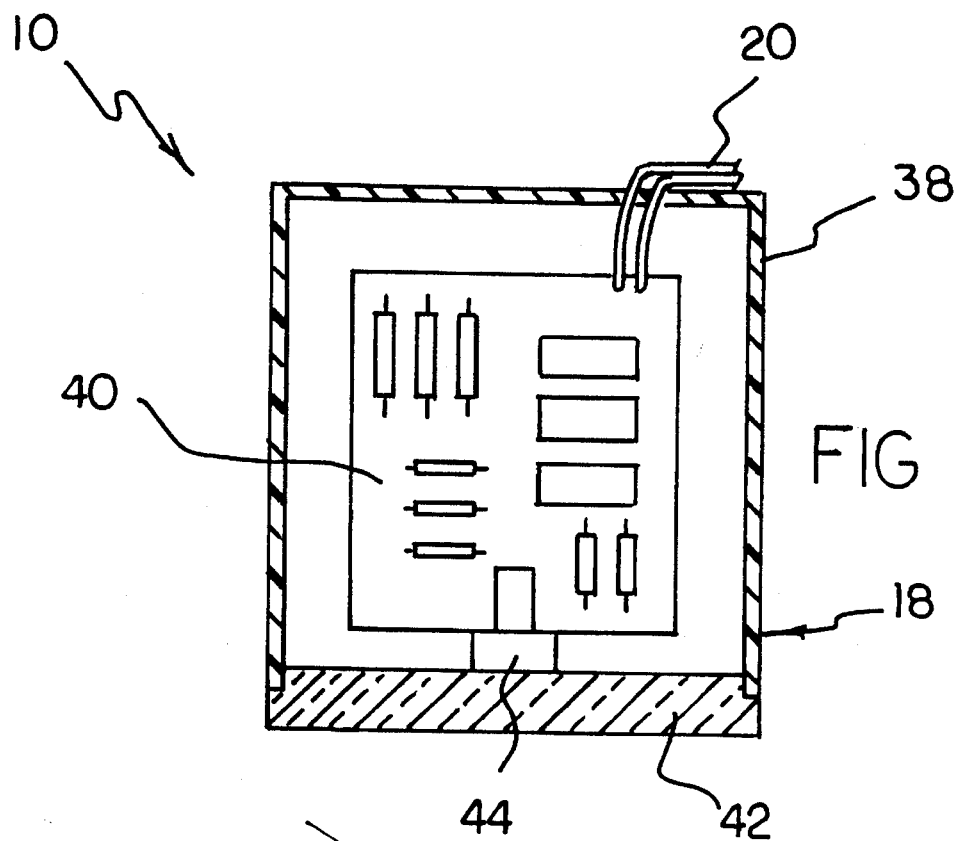
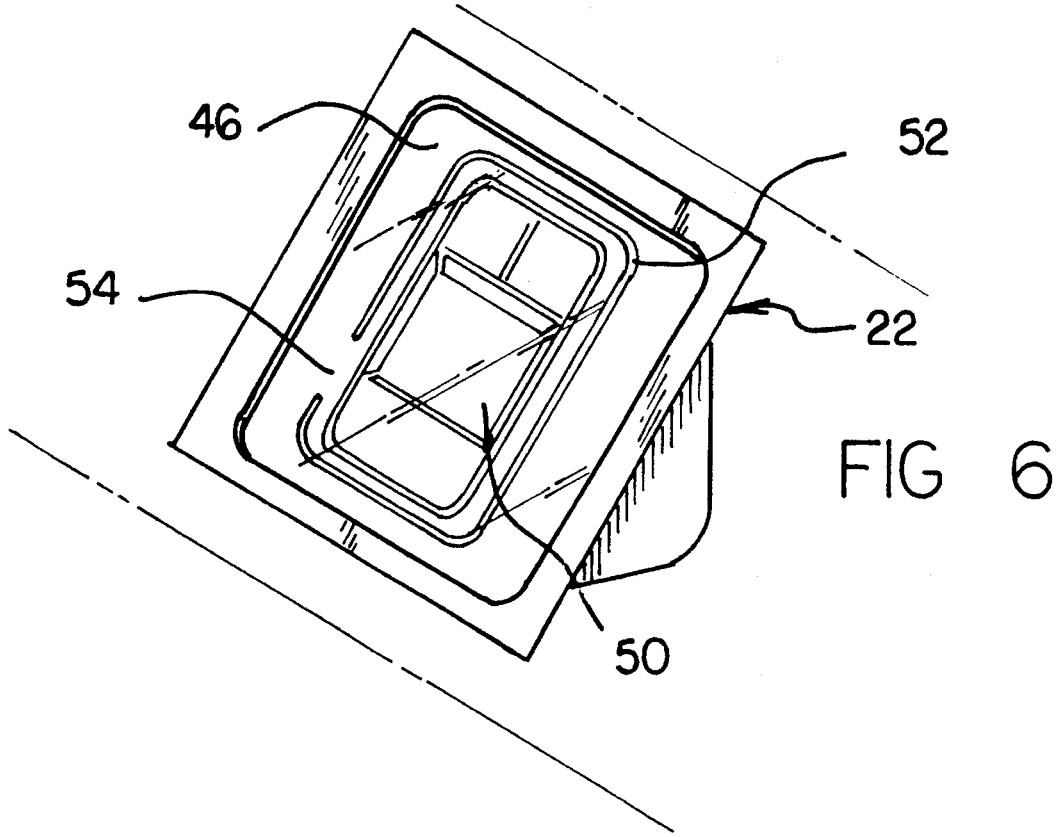

VEHICLE OBSTACLE MONITORING SYSTEM

BACKGROUND OF THE INVENTION

1. Field of the Invention

The present invention relates to obstacle detectors and more particularly pertains to a vehicle obstacle monitoring system for use with a vehicle to alert a driver to a presence of an obstacle within a predetermined distance from the vehicle.

2. Description of the Prior Art

The use of obstacle detectors is known in the prior art. More specifically, obstacle detectors heretofore devised and utilized for the purpose of detecting obstacles proximate a vehicle are known to consist basically of familiar, expected and obvious structural configurations, notwithstanding the myriad of designs encompassed by the crowded prior art which have been developed for the fulfillment of countless objectives and requirements.

For example, an ultrasonic obstacle detector is illustrated in U.S. Pat. No. 5,059,946, which is sensitive to a selectively defined range for giving warning to a vehicle operator while backing. The device indicates visually an obstruction substantially out of range, close to range, and within range coupled with an in-range audio alarm giving an intermittent tone at a defined pulse rate. The rate of the audio alarm approaches non-pulsating as the objects approaches within 25 percent of the selected range. The detector is positioned towards a rear of the vehicle and generates an ultrasonic beam which encompasses objects anywhere in the range area adjacent to the vehicle's rear edge.

An obstacle detection system is disclosed in U.S. Pat. No. 4,658,385, which has a sensor unit including a plurality of ultra-sonic transducers. The device sequentially changes the number of pulses provided to groups of transducers, thereby performing front-center sensing, front-right sensing, and front-left sensing. A microcomputer computes the distance data and position data of the obstacle in accordance with obtained timer data and sensing region data and supplies an appropriate output therefor.

Another patent of interest is U.S. Pat. No. 4,694,296, which describes a vehicle approach sensing apparatus capable of sensing a sudden approach of a succeeding vehicle and emitting an alarm, while being free from malfunction that may otherwise may be caused by the noise from the succeeding vehicle which has approached at a normal speed and stopped in the proximity. The sensing apparatus includes a transmitter disposed in a rear bumper of a vehicle for transmitting ultrasonic waves towards the succeeding vehicle and a receiver disposed in the rear bumper for receiving the ultrasonic waves reflected from the succeeding vehicle.

Other relevant patents include U.S. Pat. No. 4,980,869, and U.S. Pat. No. 5,045,856.

While these devices fulfill their respective, particular objectives and requirements, the aforementioned patents do not disclose a vehicle obstacle monitoring system for use with a vehicle to alert a driver to a presence of an obstacle within a predetermined distance from the vehicle which utilizes a signal generator and a plurality of signal receivers disposed around an exterior of the vehicle to detect a signal reflected from an object within the predetermined distance. Furthermore, none of the known prior art obstacle detectors include a cathode ray tube display monitor which displays a zone image encompassing the entire car and alerts a driver to the presence of an obstacle within the zone.

In these respects, the vehicle obstacle monitoring system according to the present invention substantially departs from the conventional concepts and designs of the prior art, and in so doing provides an apparatus primarily developed for the purpose of alerting a driver to a presence of an obstacle within a predetermined distance around a vehicle.

SUMMARY OF THE INVENTION

In view of the foregoing disadvantages inherent in the known types of obstacle detectors now present in the prior art, the present invention provides a new vehicle obstacle monitoring system construction wherein the same can be utilized for detecting an obstacle within a predetermined distance from a vehicle. As such, the general purpose of the present invention, which will be described subsequently in greater detail, is to provide a new vehicle obstacle monitoring system apparatus which has many of the advantages of the obstacle detectors mentioned heretofore and many novel features that result in a vehicle obstacle monitoring system which is not anticipated, rendered obvious, suggested, or even implied by any of the prior art obstacle detectors, either alone or in any combination thereof.

To attain this, the present invention essentially comprises a vehicle obstacle monitoring system for use with a vehicle for alerting a driver to a presence of an obstacle within a predetermined distance from the vehicle. The system includes a signal generator which radiates a signal around the vehicle. A plurality of signal receivers are positioned upon an exterior of the vehicle and are each operable to detect a signal reflected from an object within the predetermined distance. A display monitor located in an interior of the vehicle displays a zone image around the car and alerts a driver to the presence of an obstacle within the zone. The device may utilize electromagnetic signals, ultrasonic signals, or infrared light signals to detect objects. An additional receiver mounting structure is also provided for detecting obstacles near a roof of a vehicle such as a truck.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle obstacle monitoring system apparatus which has many of the advantages of the obstacle detectors mentioned heretofore and many novel features that result in a vehicle obstacle monitoring system which is not anticipated, rendered obvious, suggested, or even implied by any of the prior art obstacle detectors, either alone or in any combination thereof.

It is another object of the present invention to provide a new vehicle obstacle monitoring system which may be easily and efficiently manufactured and marketed.

It is a further object of the present invention to provide a new vehicle obstacle monitoring system which is of a durable and reliable construction.

An even further object of the present invention is to provide a new vehicle obstacle monitoring system which is susceptible of a low cost of manufacture with regard to both materials and labor, and which accordingly is then susceptible of low prices of sale to the consuming public, thereby making such vehicle obstacle monitoring systems economically available to the buying public.

Still yet another object of the present invention is to provide a new vehicle obstacle monitoring system which provides in the apparatuses and methods of the prior art some of the advantages thereof, while simultaneously overcoming some of the disadvantages normally associated therewith.

Still another object of the present invention is to provide a new vehicle obstacle monitoring system for use with a vehicle to alert a driver to a presence of an obstacle within a predetermined distance from the vehicle.

Yet another object of the present invention is to provide a new vehicle obstacle monitoring system which utilizes a signal generator and a plurality of signal receivers positioned around an exterior of the vehicle to detect the signal reflected from an object within a predetermined distance of the vehicle.

Even still another object of the present invention is to provide a new vehicle obstacle monitoring system which includes a cathode ray tube display monitor located in an interior of the vehicle for displaying a zone around the vehicle and alerting a driver to the presence of an obstacle within the zone.

Even still yet another object of the present invention is to provide a new vehicle obstacle monitoring system which may be utilized for detecting obstacles near a roof of a vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a cross sectional view taken along line 5—5 of FIG. 2 detailing an interior of a receiver comprising a portion of the present invention.

FIG. 6 is a perspective view of an even further portion of the present invention.

DESCRIPTION OF THE PREFERRED EMBODIMENT

Figure 1:
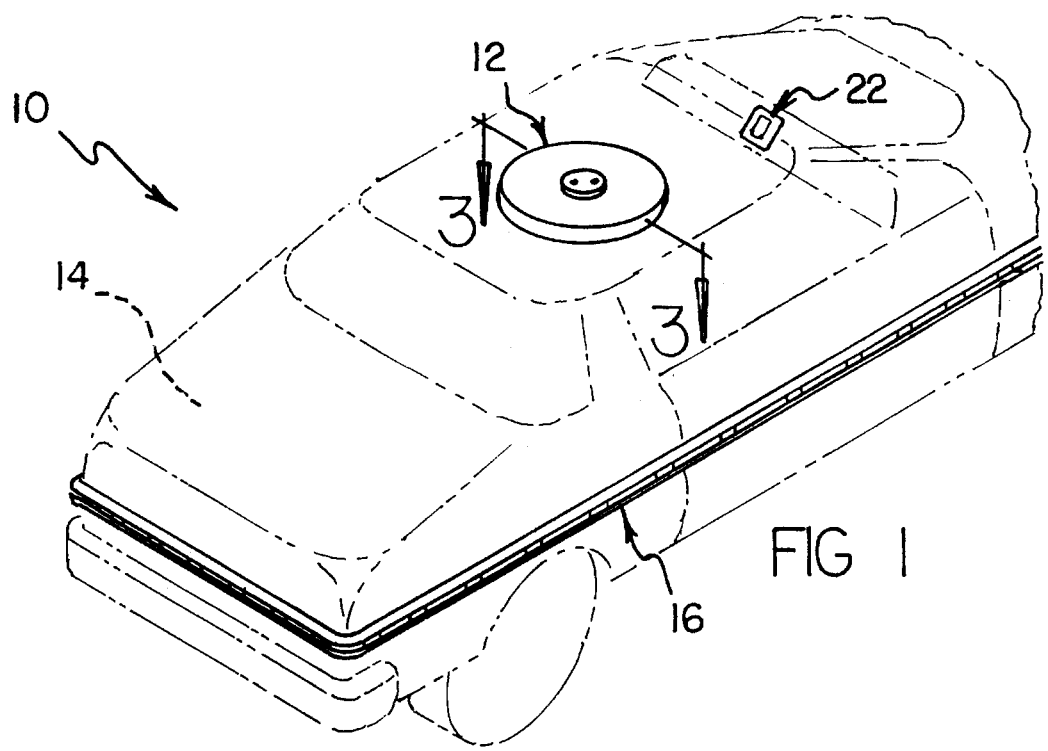
FIG. 1 is a perspective view of a vehicle obstacle monitoring system comprising the present invention as installed on a conventional vehicle.

With reference now to the drawings, and in particular to FIGS. 1–8 thereof, a new vehicle obstacle monitoring system embodying the principles and concepts of the present invention and generally designated by the reference numeral 10 will be described.

The vehicle obstacle monitoring system 10 comprises a rotating transmitter assembly 12 which may be installed on a conventional vehicle 14, as best illustrated in FIG. 1. The transmitter assembly 12 is typically mounted in an interior of the vehicle 14 and is operable to radiate a signal therefrom. A receiver assembly 16 encompasses an exterior perimeter of the vehicle 14 and includes a plurality of receivers 18 positioned in a spaced relationship therearound. Each of the receivers 18 is operable to detect a signal generated by the transmitter assembly 12 which has reflected off an object near the vehicle 14. Such detection is then communicated through wires 20 to a display assembly 22 located within the passenger compartment of the vehicle 14. The display assembly 22 is operable to alert a driver of the vehicle 14 to the presence of an obstacle within a predetermined distance of the vehicle. As a result, the system 10 allows the driver to maneuver through tight areas and accomplish parallel parking with ease.

Figure 3:
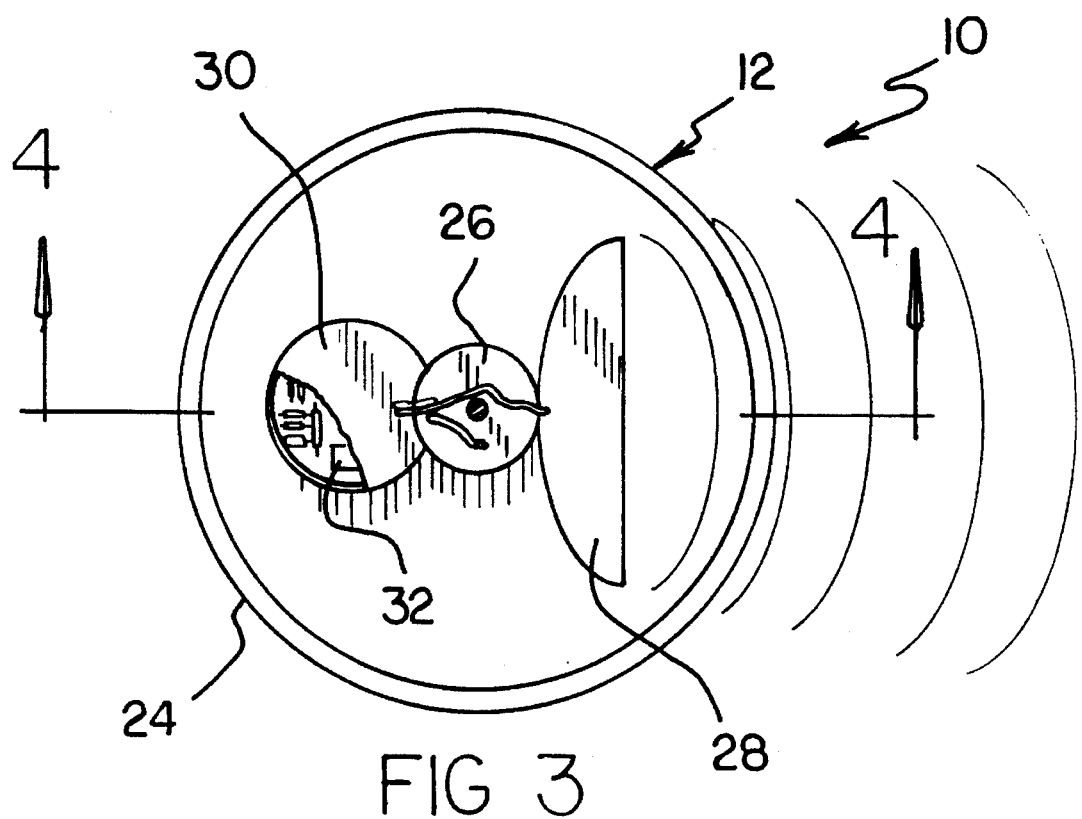
FIG. 3 is a top plan view of a transmitter assembly comprising a further portion of the invention.
Figure 4:
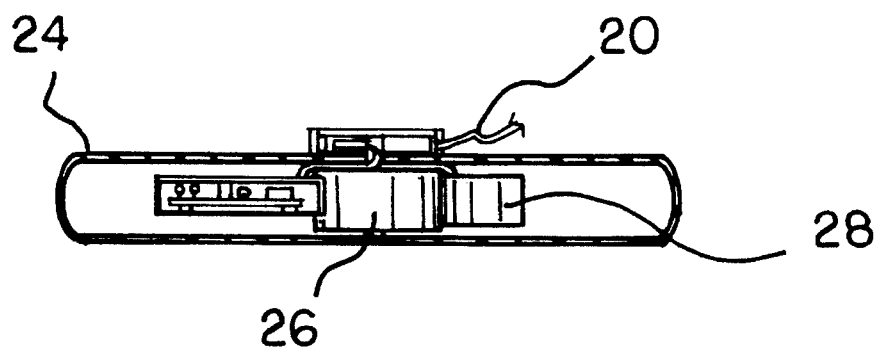
FIG. 4 is a cross sectional view taken along line 4—4 of FIG. 3 detailing an interior of the transmitter assembly.

More specifically, it will be noted that the vehicle obstacle monitoring system 10 comprises a transmitter assembly 12 which may be mounted to an exterior or interior surface of a vehicle 14. In the preferred embodiment, the transmitter assembly 12 is mounted to an interior ceiling area of the vehicle 14 by conventional means such as fasteners or the like. Referring now to FIG. 3, it can be shown that the transmitter assembly 12 comprises a transmitter housing 24 having a substantially cylindrical shape which supports and encloses a motor 26 therein. The motor 26 is supported in a center area of the transmitter housing 24 and is operable to rotate concentrically with respect thereto. A signal generator 28 is fixedly secured to the motor 26 so as to rotate therewith. Further fixedly secured to the motor 26 in a diametrically opposed relationship to the signal generator 28, is a counter weight 30 which contains conventional electronic transmitter components 32 therein. The components 32 are electrically connected to the signal generator 28 through conventional wires and, together, are operable to generate a propagating signal. As the motor 26 rotates, the signal generated by the signal generator 28 is distributed 360 degrees around the vehicle 14.

Any conventional signal may be generated by the signal generator 28 and its associated conventional electronic transmitter components 32. However, the present invention desires a use of more common signals such as electromagnetic signals, ultrasonic signals, or infrared light signals. In the preferred embodiment of the present invention, the signal generator 28 comprises an infrared signal generator which radiates infrared light signals therefrom. Because the human eye is unable to detect infrared light, the signal generated by the signal generator 28 will be unnoticeable by the driver and passengers of the vehicle 14.

The signal generated by the signal generator 28 is operable to be reflected off of objects located proximate the vehicle 14, whereby the signal may then be detected by the receiver assembly 16 which encompasses the vehicle. As best illustrated in FIG. 1, the receiver assembly 16 comprises a molding 34 which preferably completely encircles a periphery of the vehicle 14. However, it should be understood that the receiver assembly 16 may encompass only a portion of the vehicle 14 as well. The molding 34 is comprised of a substantially semi-circular member formed of an elastomeric material and having a longitudinal Journal extending therealong. Disposed within the longitudinal journal is a plurality of receivers 18 which are each individually operable to detect the signal generated by the transmitter assembly 12 upon a reflection of the signal off of a nearby object. In the preferred embodiment, the area monitored surrounding the vehicle is approximately 12 inches. However, this predetermined distance may be adjusted to any desired value through conventional sensitivity adjustment means.

Figure 2:
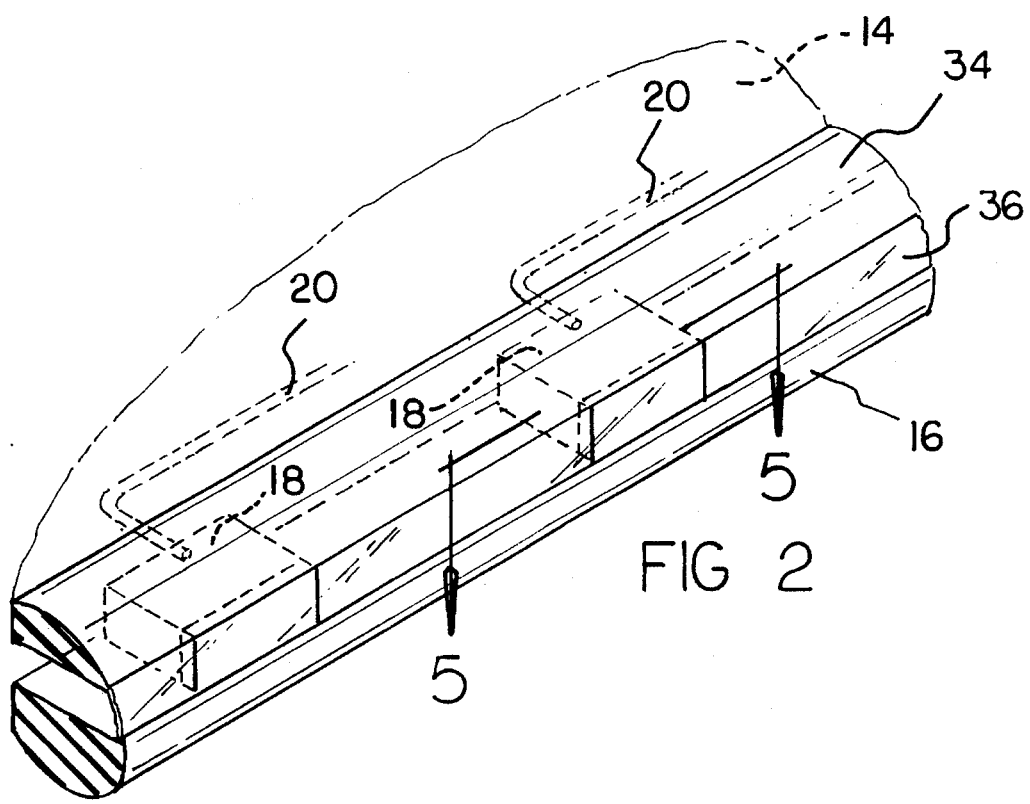
FIG. 2 is an enlarged perspective view of a portion of the present invention.

As best illustrated in FIG. 2, the receivers 18 are arranged in a spaced relationship to each other and are enclosed by a molding lens 36 which fits flushly against the molding 34 to effectively disguise the receivers 18 positioned therebeneath yet allow communication through the lens to the receivers. In the preferred embodiment, the molding 34 is comprised of a substantially black material and the molding lens 36 is formed of a smoked, translucent material which also appears black in color so as to blend together with the molding 34 and completely disguise the receivers 18. Suitable translucent materials which are transparent to infrared light signals are conventionally known and will therefore not be described in detail.

FIG. 5 illustrates an interior of each of the receivers 18 and from this Figure it can be shown that the receivers each comprise a receiver housing 38 having a substantially rectangular shape and enclosing conventional electronic receiver components 40 therein. Located near a front of the receiver housing 38 is a receiver lens 42 formed of a material transparent or translucent to infrared light signals. A signal detector 44 is positioned immediately behind the receiver lens 42 and is in electrical communication with the conventional electronic receiver components 40 contained within the receiver housing 38. Although the receiver 28 has been described in detail as being operable to receive only infrared light signals, it should be understood that similar conventional receivers may be utilized to detect other signals such as the electromagnetic signals or the ultrasonic signals mentioned above.

The wires 20 exiting the receiver housing 38 provide electrical communication between the receivers 18 and a display assembly 22 located in a dashboard of the vehicle 14. FIG. 6 illustrates the display assembly 22 which comprises a CRT display 46. The CRT display 46 is in electrical communication with display electronics 48 which communicate with the receivers 18 to generate an image on the CRT display. As best illustrated in FIG. 6, the image on the CRT display 46 comprises a vehicle image 50 depicting a plan view of the vehicle 14. A zone image 52 is displayed surrounding the vehicle and is operable to indicate to a user that the area surrounding the vehicle is free of obstructions. A break in the zone image 52, designated as a zone break 54 on the CRT display 46, indicates to the driver that an obstacle has been detected within the predetermined distance proximate the portion of the vehicle 14 as indicated by the location of the zone break on the display. In addition, an unillustrated audible alarm may also be provided to further alert the driver to the obstacle.

Figure 8:
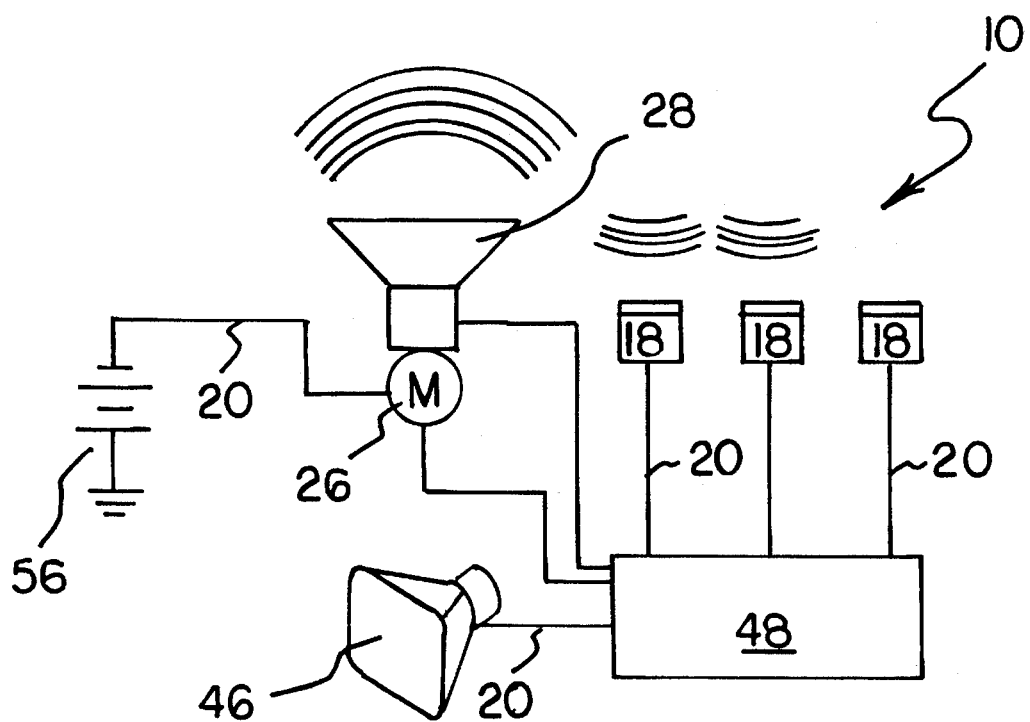
FIG. 8 is a diagrammatic circuit illustrating an interaction of the components of the vehicle obstacle monitoring system.

FIG. 8 illustrates the electrical interconnections provided by the wires 20 between the components of the vehicle obstacle monitoring system 10. The system 10 is electrically connected to a vehicle power source 56 such as the vehicle battery and, therefore, no other additional power supply is necessary. It is believed that the diagram in FIG. 8 adequately illustrates the interaction between the components of the system 10 and, coupled with the above description, will allow one who is skilled in the art to make and use the present invention.

Figure 7:
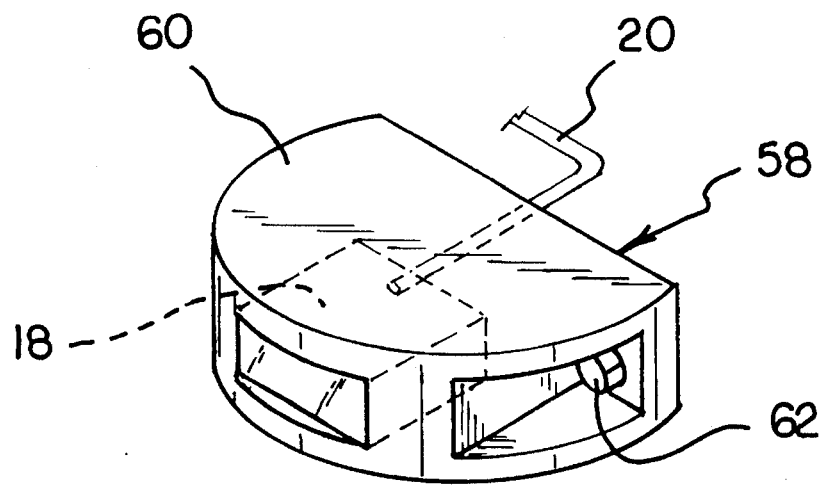
FIG. 7 is a perspective view of an additional receiver comprising a portion of the invention.

For larger vehicles, such as tractor trailers and the like, an additional receiver 58 may also be provided for mounting upon a roof or other area of such a vehicle to detect obstacles near such roof or area. The additional receiver 58 is illustrated in FIG. 7 and comprises an additional receiver support 60 operable to contain one of the receivers 18 therein. The additional receiver support may be fixedly secured to the roof or other area of the truck by a conventional fastener 62, such as a screw, rivet, or the like. The additional receiver 58 operates in a substantially similar manner as the receiver assembly 16 and is useful to detect low hanging, overhead obstacles which reflect the signal generated by the transmitter assembly 12.

In use, the transmitter assembly 12 generates a signal which encompasses the vehicle, whereby it may be reflected from nearby objects. The receiver assembly 16 and, optionally, the additional receiver 58 are operable to detect the signal reflected from a nearby object located within the predetermined distance from the vehicle 14. The sensitivity of the receivers 18 may be individually adjusted by conventional means to change the predetermined distance to any desired value. The vehicle obstacle monitoring system 10 allows a user to accomplish tight vehicle maneuvers without worry that the vehicle 14 will contact an obstacle which is not visible to the driver.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new vehicle obstacle monitoring system for use with a vehicle having a battery, said system comprising:

a rotating transmitter assembly in electrical communication with said battery and secured to a portion of said vehicle for radiating a signal, said transmitter assembly comprises a transmitter housing secured to an interior ceiling area of said vehicle and having a motor supported therein with said motor being operable to rotate with respect to said transmitter housing, an infrared signal generator in electrical communication with said transmitter assembly and secured to said motor so as to rotate therewith and operable to generate said signal, and a counterweight with electronic transmitter components within the counterweight and coupled to said motor in a diametrically opposed relationship to said signal generator;

a receiver assembly means secured to a portion of said vehicle for detecting said signal reflected from an object positioned within a predetermined distance of said vehicle, said receiver assembly means comprises a substantially semi-circular molding secured to and encircling an exterior of said vehicle, said molding having a longitudinal journal therealong, and a plurality of infrared receivers positioned in a spaced relationship within said longitudinal journal; and, a display assembly means positioned within an interior of said vehicle, said display assembly means being in electrical communication with said battery and said receiver assembly means for displaying a location of said object around said vehicle.

2. The vehicle obstacle monitoring system of claim 1, wherein said receiver assembly means further comprises a molding lens attachable to said molding for disguising said plurality of receivers.

3. The vehicle obstacle monitoring system of claim 2, wherein said display assembly means comprises a cathode ray tube display operable to display both a plan view image of said vehicle and a zone image encircling said plan view image of said vehicle, whereby a zone break image is displayed at a corresponding location of said zone image upon a detection of said signal by one of said plurality of receivers.

4. The vehicle obstacle monitoring system of claim 3, and further comprising an additional receiver means positionable upon a roof of said vehicle for detecting an object near said roof.

5. A new vehicle obstacle monitoring system for use with a vehicle having a battery, said system comprising:

a transmitter assembly means in electrical communication with said battery and secured to a portion of said vehicle for radiating a signal;

means for rotating the transmitter assembly and thereby radiating said signal around said vehicle;

a receiver assembly means secured to a portion of said vehicle for detecting said signal reflected from an object positioned within a predetermined distance of said vehicle; and a display assembly means positioned within an interior of said vehicle, said display assembly means being in electrical communication with said battery and said receiver assembly means for displaying a location of said object around said vehicle, said transmitter assembly means comprises a transmitter housing secured to an interior ceiling area of said vehicle and having a motor supported therein, said motor being operable to rotate with respect to said transmitter housing; a signal generator in electrical communication with said transmitter assembly means and secured to said motor so as to rotate therewith and operable to generate said signal; and a counterweight containing electronic transmitter components electrical cooperable with said signal generator, said counterweight being coupled to said motor in a diametrically opposed relationship to said signal generator, said receiver assembly means comprises a substantially semi-circular molding secured to and encircling an exterior of said vehicle, said molding having a longitudinal journal therealong, and a plurality of infra-red receivers positioned in a spaced relationship within said longitudinal journal.

* * * * *